UNITED STATES PATENT OFFICE.

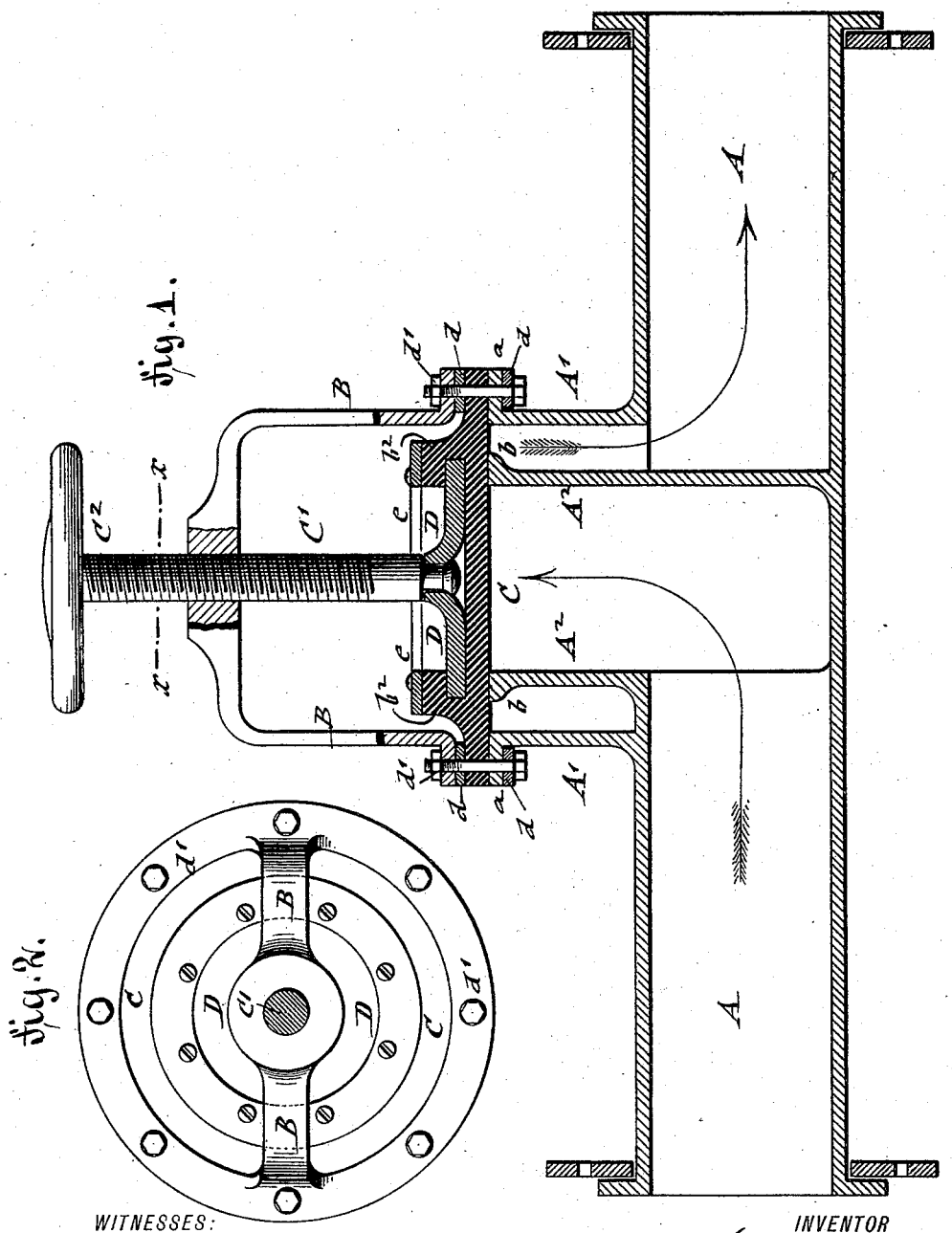

MICHAEL ZILLES, OF PASSAIC, NEW JERSEY, ASSIGNOR OF ONE-HALF TO AUGUST KRAMER, OF SAME PLACE.

DIAPHRAGM-VALVE.

SPECIFICATION forming part of Letters Patent No. 365,767, dated June 28, 1887.

Application filed July 28, 1886. Serial No. 209,327. (No model.)

*To all whom it may concern:*

Be it known that I, MICHAEL ZILLES, of Passaic, in the county of Passaic and State of New Jersey, have invented certain new and useful Improvements in Diaphragm-Valves, of which the following is a specification.

This invention relates to an improved diaphragm-valve which is specially designed to be used as a valve or stop-cock for pipes which convey acids or other chemicals that exert a corrosive action on the metallic or other parts; and the invention consists of a diaphragm-valve in which a rubber diaphragm is fitted by ring-shaped washers to an exterior flanged cylinder and pressed on the valve-seat of the conveying-pipe. A screw spindle that passes through a fixed yoke is connected by a metallic disk with a ring-shaped collar at the upper side of the diaphragm, so as to open or close the same, said collar being made integral therewith and re-enforced by a metallic washer attached thereto, as will appear more fully hereinafter, and finally be pointed out in the claim.

In the accompanying drawings, Figure 1 represents a vertical longitudinal section of my improved diaphragm-valve for pipes conveying acids or other chemicals; and Fig. 2 is a plan of the same, partly in horizontal section on line $x\,x$, Fig. 1.

Similar letters of reference indicate corresponding parts.

A in the drawings represents a pipe-section, which is made of lead or other suitable non-corrosive metal, and coupled in any approved manner to the connecting pipe-sections. The pipe-section A is provided with a cylindrical portion, A', at right angles thereto, and inside of the same with a second cylindrical portion, A², concentric to the outer portion, A', which inner portion extends at one side from the upper part of the pipe-section A to the other side at the bottom of the same, as shown in Fig. 1. The outer cylindrical portion, A', is provided with an outwardly-bent flange, $a$, while the inner portion, A², is provided with an enlarged rim or seat, $b$. A rubber diaphragm, C, rests on the seat $b$, and is attached to the flange $a$ by ring-shaped washers $d\,d$ and fastening screw-bolts $d'$, which also serve to attach a yoke or casing, B, of suitable metal.

Through the middle part of the yoke or casing B passes a screw-spindle, C', which is provided at its outer end with a hand-wheel, C², and which is swiveled at its inner end by an annular groove to the hub of a metallic disk or saddle-plate, D, which is applied to the rubber diaphragm C by means of an annular flanged collar, $b^2$, that is made integral with the diaphragm C, and re-enforced by a metallic washer, $e$, that is riveted to the top of the collar $b^2$. The collar $b^2$ serves to connect the diaphragm B' to the disk D, so that the screw-spindle C' can raise or lower the diaphragm, according as the same is raised or lowered in the yoke or casing B. The diaphragm can thus be pressed tightly on the seat of the interior portion, A², or moved away from the same, so as to interrupt or establish the flow of the acid or other chemicals from one side of the pipe A' through the interior valve-cylinder, A², to the other side of the pipe without coming in contact with metallic or other corrosive parts. When the diaphragm is worn out by use, it is replaced by a new one, which is readily accomplished by unscrewing the yoke and attaching a new diaphragm to the flanged exterior valve-cylinder, A'. With each valve a number of diaphragms may be furnished, so that the valve can be used for a considerable length of time. It is specially useful for conveying acids or other chemicals in petroleum-distilleries, chemical-factories, &c., as it has no corrosive parts which can deteriorate by the action of the chemicals.

Having thus described my invention, I claim as new and desire to secure by Letters Patent—

The combination of a pipe-section having a flanged exterior valve portion, an interior valve-seat concentric to said exterior portion, a flexible diaphragm attached to the exterior portion, a yoke or valve-casing, a screw-spindle passing through the yoke or casing, a disk swiveled to the inner end of the screw-spindle, and an annular collar made integral with the diaphragm and sprung over the disk, so as to establish connection between the spindle and diaphragm, substantially as set forth.

In testimony that I claim the foregoing as my invention I have signed my name in presence of two subscribing witnesses.

MICHAEL ZILLES.

Witnesses:
PAUL GOEPEL,
SIDNEY MANN.